United States Patent [19]

Jones et al.

[11] 4,435,534

[45] Mar. 6, 1984

[54] COALESCENT-CONTAINING COATING COMPOSITION

[75] Inventors: Glenn C. Jones; Larry J. Culver, both of Kingsport, Tenn.

[73] Assignee: Eastman Kodak Company, Rochester, N.Y.

[21] Appl. No.: 394,557

[22] Filed: Jul. 2, 1982

[51] Int. Cl.³ ............................................. C08K 5/10
[52] U.S. Cl. .................................................... 524/292
[58] Field of Search ......................................... 524/292

[56] References Cited

U.S. PATENT DOCUMENTS

| | | | |
|---|---|---|---|
| 2,218,237 | 10/1940 | Gordon | 260/36 |
| 3,126,355 | 3/1964 | Birten et al. | 260/8 |
| 3,399,158 | 8/1968 | Huitson | 260/29.6 |
| 3,532,454 | 10/1970 | Fuhr et al. | 8/4 |
| 3,917,447 | 11/1975 | Lazar et al. | 8/92 |
| 4,172,064 | 10/1979 | Keeler | 260/29.6 |
| 4,265,797 | 5/1981 | Suk | 260/29.6 E |

OTHER PUBLICATIONS

Journal of Paint Technology 45, (579, Apr. 1973), pp. 51–56, Kenneth L. Hoy, Union Carbide Corp; *Estimating the Effectiveness of Latex Coalescing Aids.*

*Primary Examiner*—Paul R. Michl
*Assistant Examiner*—Alex H. Walker
*Attorney, Agent, or Firm*—David E. Cotey; Daniel B. Reece, III

[57] ABSTRACT

The present invention relates to a novel coating composition which contains a coalescent. The coating composition comprises a latex of a normally solid organic addition polymer and a coalescing amount of an ether-ester solvent having the formula

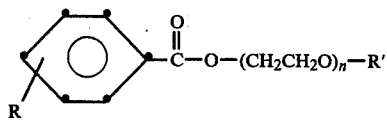

where R represents hydrogen or an alkyl group of 1 to 4 carbon atoms, R' represents a $C_1$–$C_4$ alkyl group, and n is 1 or 2. Preferred coalescents include 2-ethoxyethyl p-toluate, 2-ethoxyethyl benzoate, 2-(2-ethoxyethoxy)ethyl p-toluate, 2-(2-ethoxyethoxy)-ethyl benzoate, 2-propoxyethyl o-toluate, 2-propoxyethyl benzoate, 2-ethoxyethyl o-toluate, and mixtures thereof. In preferred embodiments, the organic addition polymer comprises an acrylic homopolymer or copolymer. The coating composition preferably comprises about 5–50 parts by weight of the ether-ester solvent per 100 parts of the organic addition polymer.

12 Claims, No Drawings

COALESCENT-CONTAINING COATING COMPOSITION

DESCRIPTION

Background of the Invention

This invention relates to synthetic polymer latexes useful in coating applications wherein the latexes have coalescing agents incorporated therein.

The film properties of a water-borne dispersion coating are strongly influenced by the coalescing solvent within the system. The purpose of a coalescent is to solvate the particles of a dispersion during the final stages of drying in order to yield a homogeneous, continuous film. In some instances, present commercial coalescing agents evaporate too slowly, are inefficient at reducing minimum filming temperature, or have an objectionable odor. The present invention provides an ether-ester coalescent not heretofore disclosed in the art.

U.S. Pat. Nos. 3,532,454 and 3,917,447 disclose ether-esters and their use as dye assist compounds. The use of such compounds as coalescing agents is not disclosed. U.S. Pat. Nos. 4,022,808 and 4,115,415 disclose methods for the production of alkylene glycol ether-esters of organic acids. Again, however, there is no disclosure of the use of such compounds as coalescents.

Other types of coalescing solvents are known in the art. For example, U.S. Pat. No. 4,265,797 discloses that suitable coalescing solvents include lower monoalkyl ethers of ethylene or propylene glycol, such as propylene glycol methyl ether. U.S. Pat. No. 3,399,158 discloses that diesters of aliphatic $C_2$-$C_6$ dicarboxylic acids are effective as coalescing agents for copolymer emulsion paints. Preferred coalescing agents are dimethyl succinate, diethyl succinate, and diisopropyl succinate. Neither of these patents discloses nor suggests the coating composition of the present invention, the use therein of specified ether-esters as coalescing agents, and the improvement in film integrity attained thereby.

Other coalescing agents known in the art include ethylene glycol monobutyl ether acetates (butyl Cellosolve ® acetate—Union Carbide; EKTASOLVE ®EB Acetate—Eastman Chemical Products, Inc.), diethylene glycol monoethyl ether (Carbitol ®, low gravity solvent—Union Carbide; EKTASOLVE ®-DE—Eastman Chemical Products, Inc.), and 2,2,4-trimethylpentanediol-1,3-monoisobutyrate (Texanol TM). Again, none of these coalescing agents is of the type employed in the compositions of the present invention. Thus, the advantages resulting from the coating compositions of the present invention would not be apparent to one of ordinary skill in the art from a knowledge of these prior art coalescing agents.

The present invention provides coating compositions containing specified ether-ester coalescing agents. The compositions may be based upon thermoplastic or thermosetting polymer resins. The coating compositions demonstrate improved film integrity of the final dried coating. The compositions are designed as a basis for the formulation of ambient or forced dry finishes which may be applied by an appropriate method to a variety of substrates.

SUMMARY OF THE INVENTION

The present invention provides a coating composition comprising a latex of a normally solid organic addition polymer and a coalescing amount of an ether-ester solvent having the formula

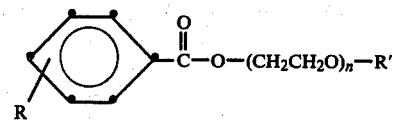

where R represents hydrogen or an alkyl group of 1 to 4 carbon atoms, R' represents a $C_1$-$C_4$ alkyl group, and n is 1 or 2.

DETAILED DESCRIPTION OF THE INVENTION

The present invention pertains to novel aqueous coating compositions comprising normally solid thermoplastic or thermosetting organic addition polymers in an emulsion state in an aqueous continuous phase. The compositions further comprise a coalescing amount of an ether-ester solvent.

The ether-ester solvents utilized in the coating compositions of the present invention are of the following structural formula:

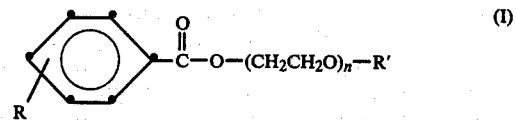

In Formula I above, R represents hydrogen or an alkyl group of 1 to 4 carbon atoms, R' represents a $C_1$-$C_4$ alkyl group, and n is 1 or 2. The R groups may be positioned ortho, meta, or para to the ester linkage. R is preferably H, o-methyl, or p-methyl. The alkyl groups within the structure of the ether-ester coalescing agent may be either straight chains or branched chains. R' is preferably ethyl or n-propyl.

Examples of suitable ether-esters include 2-ethoxyethyl p-toluate, 2-ethoxyethyl benzoate, 2-(2-ethoxyethoxy)ethyl p-toluate, 2-(2-ethoxyethoxy)ethyl benzoate, 2-propoxyethyl o-toluate, 2-propoxyethyl benzoate, 2-ethoxyethyl o-toluate, etc. Mixtures of the compounds represented by Formula I are also suitable as coalescing agents. In fact, among preferred coalescents are a mixture of 2-ethoxyethyl p-toluate and 2-ethoxyethyl benzoate and a mixture of 2-(2-ethoxyethoxy)ethyl p-toluate and 2-(2-ethoxyethoxy)ethyl benzoate. It has been found that the relative ratios of the individual components of the described mixtures does not greatly affect the properties of the final coating.

The ether-ester compounds described above which are utilized as coalescing agents in the coating composition of the present invention may be prepared by any method known in the art. For example, such compounds can be prepared from commercially available solvents such as Ektasolve DE ® and Ektasolve EE ® (available commercially from Eastman Chemical Products, Inc.) by typical esterification techniques. Also, as mentioned above, methods for the preparation of such ether-ester compounds are disclosed in U.S. Pat. Nos. 4,022,808 and 4,115,415, which are herein incorporated by reference in their entireties.

The coating compositions of the present invention also comprise a synthetic polymer latex. For the purposes of this invention, the synthetic polymer latex is a stable aqueous colloidal dispersion of a normally solid thermoplastic or thermosetting organic addition polymer in an emulsion state in an aqueous continuous phase. Suitable polymerizable unsaturated monomers, aqueous polymerization media, catalysts, emulsifiers, procedures, and means for making latexes are well known in the art. Of particular interest in this invention are the latexes of acrylic polymers and polymerized vinyl esters of saturated carboxylic acid. Examples of acrylic polymers include polymerizates of one or more alkyl acrylates such as ethyl acrylate, butyl acrylate, 2-ethylhexyl acrylate, 2-ethoxyethyl acrylate, and other similar alkyl acrylates. Advantageously, from about 20 to about 80 weight percent of one or more of the above alkyl acrylates are copolymerized with from about 80 to about 20 weight percent of a hardening monomer such as methyl methacrylate, 2-ethoxyethyl methacrylate, styrene, or acrylonitrile and from about 0.1 to about 5 weight percent of a polymerizable acid such as acrylic or methacrylic acid. Examples of vinyl esters of carboxylic acids are vinyl acetate and vinyl propionate. Especially preferred polymer latexes are high $T_g$ acrylic emulsions such as UCAR 4510, which is a thermosetting, styrene-acrylic latex available commercially from Union Carbide Corporation; Neocryl A-630, which is a thermoplastic acrylic copolymer available commercially from Polyvinyl Chemical Company; and Rhoplex WL-91, which is a thermoplastic acrylic polymer available commercially from the Rohm and Haas Company.

The coalescing agent is added to the polymer latex in at least a coalescing amount. By coalescing amount is meant that amount that will facilitate the formation of a continuous film upon drying a coating of the latex under the drying conditions to be employed, preferably under ambient conditions. The coalescing amount will vary according to latex type, formulation, and the specific coalescing agent used. However, in most formulations, a coalescing amount is within the range of about 5 to about 50 parts (dry) by weight of coalescing agent per 100 parts (dry) of latex polymer. Preferably, the level of coalescing agent used is the minimum amount that will effect coalescence, e.g., about 5 to about 15 percent (dry) by weight based on dry weight of the latex polymer.

In the preferred practice of the present invention, the aqueous coating composition contains conventional adjuncts in addition to the latex and coalescing agent. Generally, the adjuncts range from about 100 to about 450 dry weight parts based on 100 dry weight parts of latex polymer. Customary adjuncts to the latex include thickener, defoamer, surface active agent, catalyst, pigment, antimicrobial agent, and, in many cases, protective colloid. Generally, these adjuncts are thoroughly blended before their addition to the latex. Selection of the exact adjuncts and the method of blending them with the latex will depend upon the end-use application of the formulation. Neither the adjuncts nor the blending methods are critical to the composition of the present invention. Preferably such adjuncts are added to the latex prior to the combination of the latex with the coalescing agent. After addition of the usual adjuncts and the coalescing agent, the pH of the composition is adjusted.

The resulting coating composition can easily be applied conventionally using a brush, roller, or like means and requires no unusual methods of drying to form the desired film. Thus, coatings formed from the composition of the present invention may be dried under ambient conditions or with the use of forced air drying techniques. Choice of drying conditions will be dictated by the thermoplastic or thermosetting nature of film formation. Chemical crosslinking of thermosetting systems ordinarily requires elevated temperature.

This invention will be further illustrated by the following Examples although it will be understood that these Examples are included merely for purposes of illustration and are not intended to limit the scope of the invention.

EXAMPLES 1–15

These Examples illustrate the relative efficiency as coalescents of ether-esters which are suitable for use in the compositions of the present invention in comparison with Texanol TM ester-alcohol (2,2,4-trimethylpentanediol-1,3-monoisobutyrate) which is widely used commercially as a coalescent and is available from Eastman Chemical Products, Inc.

The relative efficiencies of the various compositions were measured by the use of a Coalescing Efficiency Index. The Coalescing Efficiency Index (CEI) is defined as the parts by weight of Texanol TM ester-alcohol per hundred parts of resin required to achieve a specified minimum filming temperature divided by the parts by weight of the coalescing agent being tested per hundred parts of resin required to achieve the same minimum filming temperature. The minimum filming temperatures (MFT) were measured according to ASTM Procedure D-2354-68. Thus, a CEI value greater than 1.00 indicates that the coalescing agent being tested is a more efficient filming aid than Texanol TM ester-alcohol for that specific emulsion at the designated minimum filming temperature. A CEI less than 1.00 indicates the solvent to be a less efficient filming aid than Texanol TM ester-alcohol under the test conditions.

In Table I are listed the Coalescing Efficiency Indexes for the various compositions. Examples 1, 3, and 5 represent compositions formed from UCAR 4510, Neocryl A-630, and Rhoplex WL-91, respectively, together with a mixture of 6.9% by weight of 2-ethoxyethyl benzoate and 93.1% by weight of 2-ethoxyethyl p-toluate. Examples 2, 4, and 6 represent compositions formed from UCAR 4510, Neocryl A-630, and Rhoplex WL-91, respectively, together with a mixture of 22.2% by weight of 2-(2-ethoxyethoxy)ethyl benzoate and 77.8% by weight of 2-(2-ethoxyethoxy)ethyl p-toluate. Examples 7–9 represent compositions formed from UCAR 4510, Neocryl A-630, and Rhoplex WL-90, respectively, together with 2-propoxyethyl benzoate. Examples 10–12 represent compositions formed from UCAR 4510, Neocryl A-630, and Rhoplex WL-90, respectively, together with 2-ethoxyethyl o-toluate. Examples 13–15 represent compositions formed from UCAR 4510, Neocryl A-630, and Rhoplex WL-90, respectively, together with 2-propoxyethyl o-toluate.

The results of the tests are listed in Table I.

TABLE I

| Example No. | Coalescing Efficiency Index | |
|---|---|---|
| | 40° F. MFT | 50° F. MFT |
| 1 | 1.34 | 1.34 |
| 2 | 1.20 | 1.18 |
| 3 | 1.25 | 1.20 |
| 4 | 1.22 | 1.13 |
| 5 | 1.22 | 1.25 |
| 6 | 1.28 | 1.23 |
| 7 | 1.33 | 1.28 |
| 8 | 1.30 | 1.32 |

TABLE I-continued

| Example No. | Coalescing Efficiency Index | |
|---|---|---|
| | 40° F. MFT | 50° F. MFT |
| 9 | 1.23 | 1.23 |
| 10 | 1.28 | 1.24 |
| 11 | 1.27 | 1.30 |
| 12 | 1.21 | 1.21 |
| 13 | 1.23 | 1.22 |
| 14 | 1.27 | 1.30 |
| 15 | 1.18 | 1.17 |

It can be seen from the data of Table I that in every instance the compositions of the present invention coalesced more easily than corresponding compositions containing Texanol ™ ester-alcohol as coalescing agent. These data demonstrate the lower levels of the ether-ester coalescing agents which are required in the latex coating compositions of the present invention in order to achieve improved film integrity of the final dried coating. Thus, the ether-esters demonstrate higher efficiency as coalescing agents in the compositions of the present invention.

The invention has been described in detail with particular reference to preferred embodiments thereof, but it will be understood that variations and modifications can be effected within the spirit and scope of the invention.

We claim:

1. A coating composition comprising a latex of a normally solid organic addition polymer and a coalescing amount of at least one ether-ester solvent having the formula

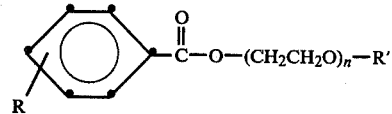

where R represents hydrogen or an alkyl group of 1 to 4 carbon atoms, R' represents a $C_1$–$C_3$ alkyl group, and n is 1 or 2.

2. The composition of claim 1 wherein R is hydrogen or methyl.
3. The composition of claim 1 wherein R' is ethyl.
4. The composition of claim 1 wherein R' is propyl.
5. The coating composition of claim 1 wherein said ether-ester solvent comprises 2-ethoxyethyl benzoate, 2-ethoxyethyl p-toluate, 2-(2-ethoxyethoxy)ethyl benzoate, 2-(2-ethoxyethoxy)ethyl p-toluate, 2-ethoxyethyl o-toluate, 2-propoxyethyl benzoate, 2-propoxyethyl o-toluate, and mixtures thereof.
6. The composition of claim 1 wherein said ether-ester solvent comprises a mixture of 2-ethoxyethyl p-toluate and 2-ethoxyethyl benzoate.
7. The composition of claim 1 wherein said ether-ester solvent comprises a mixture of 2-(2-ethoxyethoxy)ethyl p-toluate and 2-(2-ethoxyethoxy)ethyl benzoate.
8. The coating composition of claim 1 which comprises about 5 to 50 parts by weight of said ether-ester solvent per hundred parts of said organic addition polymer.
9. The coating composition of claim 1 wherein said organic addition polymer comprises a thermoplastic acrylic homopolymer.
10. The coating composition of claim 1 wherein said organic addition polymer comprises a thermoplastic acrylic copolymer.
11. The coating composition of claim 1 wherein said organic addition polymer comprises a thermosetting styrene-acrylic copolymer.
12. The coating composition of claim 1 which further comprises thickener, defoamer, surface active agent, catalyst, pigment, antimicrobial agent, and/or protective colloid.

* * * * *